United States Patent
Dong et al.

(10) Patent No.: US 8,456,042 B2
(45) Date of Patent: Jun. 4, 2013

(54) LINEAR VIBRATOR

(75) Inventors: Le-Ping Dong, Shenzhen (CN);
Yong-Hua Pu, Shenzhen (CN)

(73) Assignees: AAC Acoustic Technologies (Shenzhen) Co., Ltd., Shenzhen (CN);
American Audio Components Inc., La Verne, CA (US)

( * ) Notice: Subject to any disclaimer, the term of this patent is extended or adjusted under 35 U.S.C. 154(b) by 275 days.

(21) Appl. No.: 12/858,220

(22) Filed: Aug. 17, 2010

(65) Prior Publication Data

US 2011/0156500 A1  Jun. 30, 2011

(30) Foreign Application Priority Data

Dec. 31, 2009 (CN) ............... 2009 2 0296817 U

(51) Int. Cl.
*H02K 33/00* (2006.01)
*H02K 7/06* (2006.01)

(52) U.S. Cl.
USPC ............... 310/15; 310/17; 310/36; 310/81

(58) Field of Classification Search
USPC .................. 310/15, 25, 36, 81, 17
See application file for complete search history.

(56) References Cited

U.S. PATENT DOCUMENTS

| 3,312,841 | A | * | 4/1967 | Makino | 310/15 |
| 2009/0267423 | A1 | * | 10/2009 | Kajiwara et al. | 310/36 |
| 2010/0213773 | A1 | * | 8/2010 | Dong et al. | 310/25 |

FOREIGN PATENT DOCUMENTS

CN  101488697 A  *  7/2009

* cited by examiner

*Primary Examiner* — Tran Nguyen
*Assistant Examiner* — Jose Gonzalez Quinones
(74) *Attorney, Agent, or Firm* — IPro, Inc.; Na Xu

(57) ABSTRACT

A linear vibrator is disclosed. The linear vibrator includes a cover, a base forming a hollow space together with the cover and defining a plurality of sidewalls, a pair of elastic members received in the hollow space, a weight with a plurality of laterals suspended in the hollow space by the elastic members, and a magnet assembly provided with a plurality of magnetic poles and accommodated in the weight. Each elastic member defines at least a fastening arm comprising a connecting portion, an inner arm extending from one end of the connecting portion for abutting against the lateral of the weight, and an outer arm extending from another end of the connecting portion for abutting against the sidewall of the base. The extending direction of the inner arm and the outer arm of each fastening arm is the same. The magnetic poles of magnet assembly near the coil are opposite to each other. A height of the linear vibrator with the structure can be reduced.

16 Claims, 6 Drawing Sheets

US 8,456,042 B2

LINEAR VIBRATOR

FIELD OF THE INVENTION

The present invention generally relates to the art of vibrators and, more particularly, to a linear vibrator for generating tactile sensation.

DESCRIPTION OF RELATED ART

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibrator. A typical linear vibrator, widely used in consumer products, comprises a housing, a pair of elastic members connected to the housing, a vibrating unit suspended in the housing by the elastic members, and a coil positioned below the vibrating unit. Each elastic member defines a connecting portion, a pair of elastic arms extending from two ends of the connecting portion for connecting with the vibrating unit 30, and a fastening portion extending from a middle portion of the connecting portion and away from the elastic arm to fix the vibrating unit on the housing.

However, for fixing the vibrating unit on the housing firmly, it is difficult to reduce the height of the elastic members. Thus, the structures of the elastic members increase the height of the liner vibrator.

So, it is necessary to provide a new vibrator for solving the problem mentioned above.

SUMMARY OF THE INVENTION

In one embodiment of the present invention, a linear vibrator is disclosed. The linear vibrator comprises a cover, a base forming a hollow space together with the cover and defining a plurality of sidewalls, a pair of elastic members received in the hollow space, a weight with a plurality of laterals suspended in the hollow space by the elastic members, and a magnet assembly provided with a plurality of magnetic poles and accommodated in the weight. Wherein, each elastic member defines at least a fastening arm comprising a connecting portion, an inner arm extending from one end of the connecting portion for abutting against the lateral of the weight, and an outer arm extending from another end of the connecting portion for abutting against the sidewall of the base. The extending direction of the inner arm and the outer arm of each fastening arm is same. The magnetic poles of magnet assembly near the coil are opposite to each other.

Other features and advantages of the present invention will become more apparent to those skilled in the art upon examination of the following drawings and detailed description of exemplary embodiment.

DETAILED DESCRIPTION OF THE EXEMPLARY EMBODIMENTS

Figure 1:
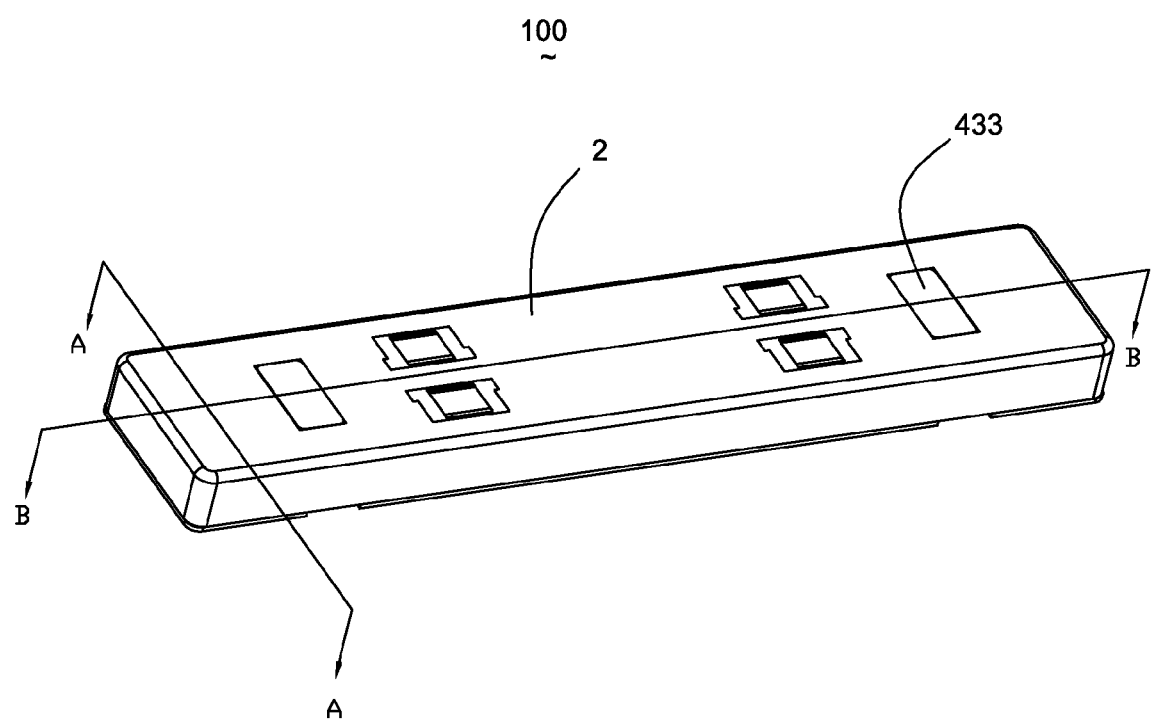
FIG. 1 is an isometric view of a linear vibrator according to a first exemplary embodiment of the present invention.

Reference will now be made to describe exemplary embodiments of the present invention in detail.

A linear vibrator is mounted on a printed circuit board for generating tactile vibration. Referring to FIGS. 1 to 6, a linear vibrator 100 in accordance with an first exemplary embodiment of the present invention comprises a cover 1, a base 2 forming a hollow space 3 together with the cover 1, a pair of elastic members 4 received in the hollow space 3, a weight 5 suspended in the hollow space 3 by the elastic members 4, a magnet assembly 6 provided with a plurality of magnetic poles (no labeled) received in the weight 5, and a pair of coils 7 positioned below the weight 5.

Figure 2:
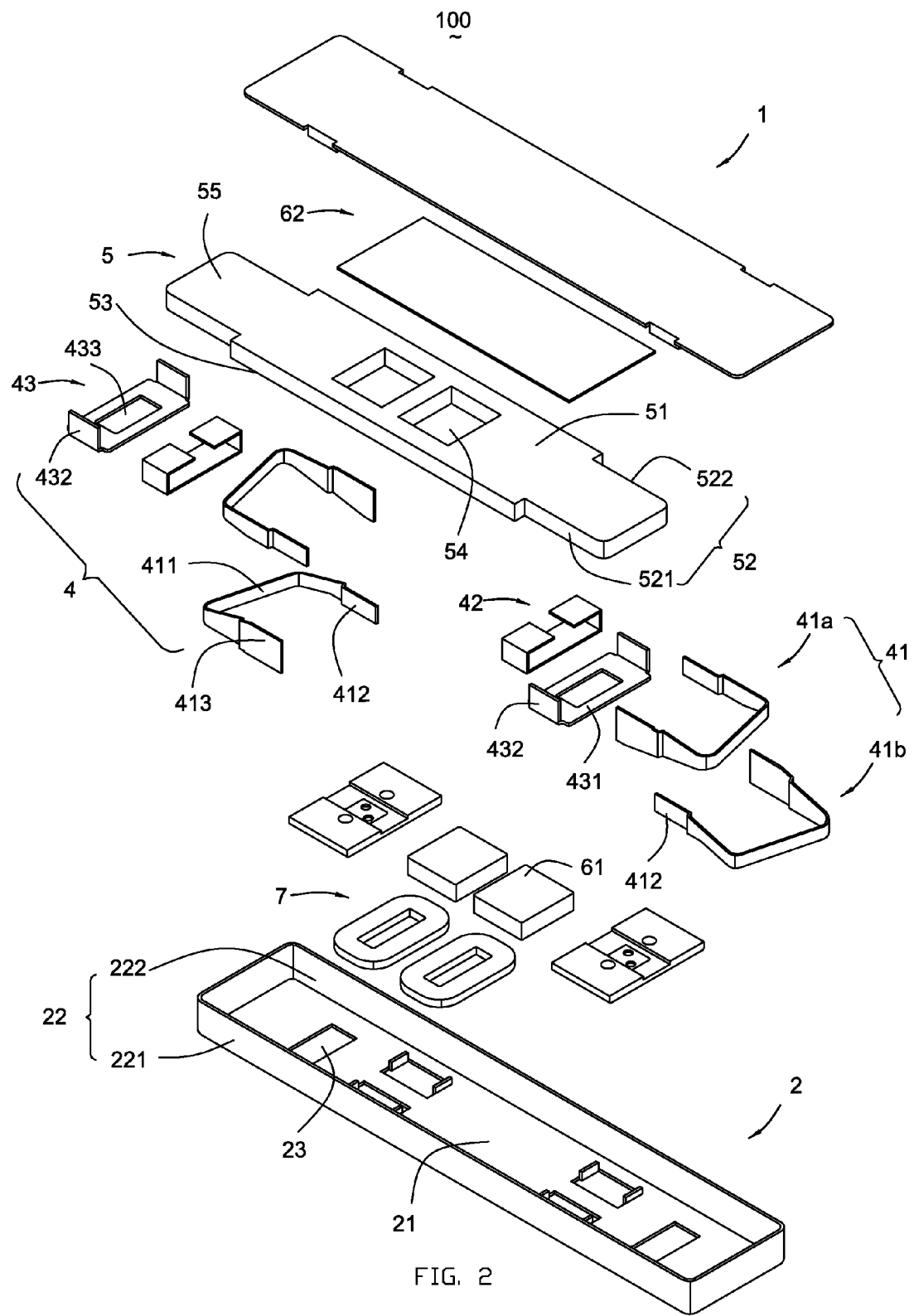
FIG. 2 is an exploded view of the linear vibrator in FIG. 1.

Referring to FIG. 2, the base 2 defines a bottom wall 21, a plurality of sidewalls 22 extending vertically from the bottom wall 21, and a pair of openings 23 provided on the bottom wall 21. The sidewalls 22 of the base 2 define a front sidewall 221 and a back sidewall 222 opposite to the front sidewall 221. The vibrating direction of the linear vibrator 100 is parallel to the bottom wall 21. The cover 1 is configured to be a plate.

Referring to FIGS. 2 to 5, the weight 5 suspended in the hollow space 3 by the elastic members 4 defines a upper surface 51, a bottom surface 53 opposite to the upper surface 51, a plurality of laterals 52 connecting the upper surface 51 and the bottom surface 52, a plurality of through holes 54 drilled completely through the upper surface 51 and the bottom surface 53, and a pair of flanges 55 provided at two ends thereof. The laterals 52 of the weight 5, perpendicular to the bottom wall 21 of the base 2, defines a front lateral 521 and a back lateral 522 opposite to the front lateral 521.

The elastic members 4 are received in the hollow space 3. Each of the elastic members 4 defines a pair of fastening arms 41. Each fastening arm 41 comprises a connecting portion 411, an inner arm 412 extending from one end of the connecting portion 411 for abutting against the lateral 52 of the weight 5, and an outer arm 413 extending from another end of the connecting portion 411 for abutting against the sidewall 22 of the base 2. The inner arm 412 extends along a direction same to a direction along which the outer arm 413 for sandwiching at least a part of the weight 5 between the inner and outer arms 412 and 413 of each elastic member 41 for proving a movement of the weight 5 moving along the direction parallel to the bottom wall 21 of the base 2. The connecting portions 411 of the pair of fastening arms 41 which are positioned on the same side of the weight 5 is separated from each other in space, thereby defining an interval L in a direction perpendicular to the bottom wall 21 of the base 2.

Figure 3:
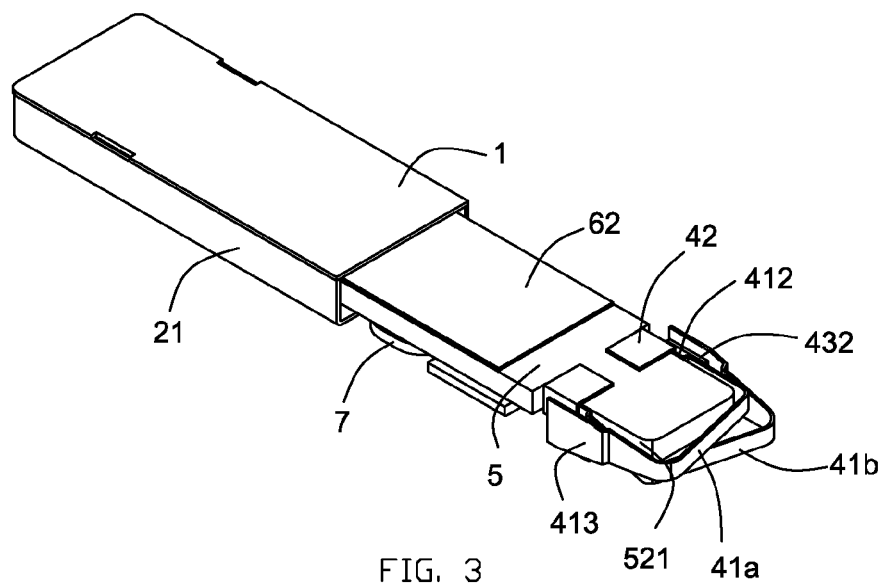
FIG. 3 is an isometric assembled of the linear vibrator, a cover and a base thereof being partially removed away.
Figure 4:
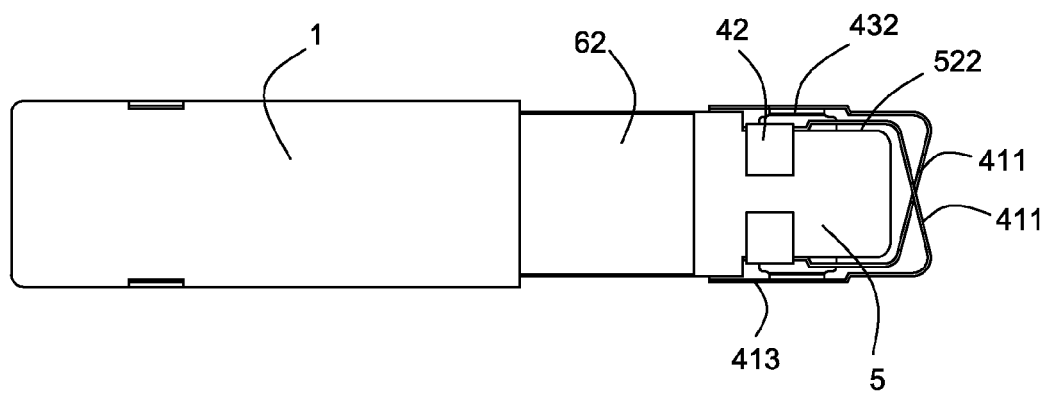
FIG. 4 is top view of FIG. 3.

Referring to FIGS. 2 to 4, each elastic member 4 defines a locking portion 42 mounted on the flange 55 of the weight 5 for cooperating with the weight 5 to fix the inner arm 412 of each fastening arm 41 firmly.

Each elastic member 4 further defines a fixing portion 43 sandwiched the locking portion 42 and the base 2. The fixing portion 43 comprises an engaging portion 431, a pair of fixing arms 432 extending from the two end of engaging portion 431, and a projecting portion 433 in the middle of the engaging portion 431 for engaging with the opening 23 of the base 2. The fixing portion 43 cooperates with the sidewall 22 of the base 2 for fixing the outer arm 413 of each fastening arm 41 firmly.

Figure 5:
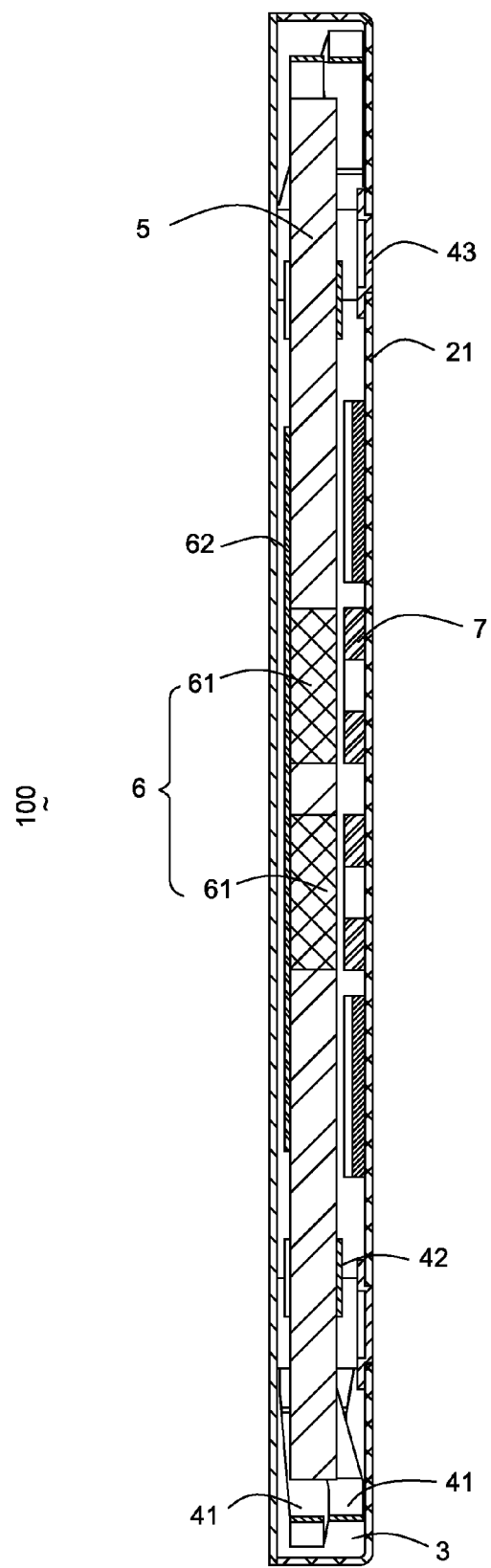
FIG. 5 is an enlarged cross-sectional view of the linear vibrator along line A-A in FIG. 1.
Figure 6:
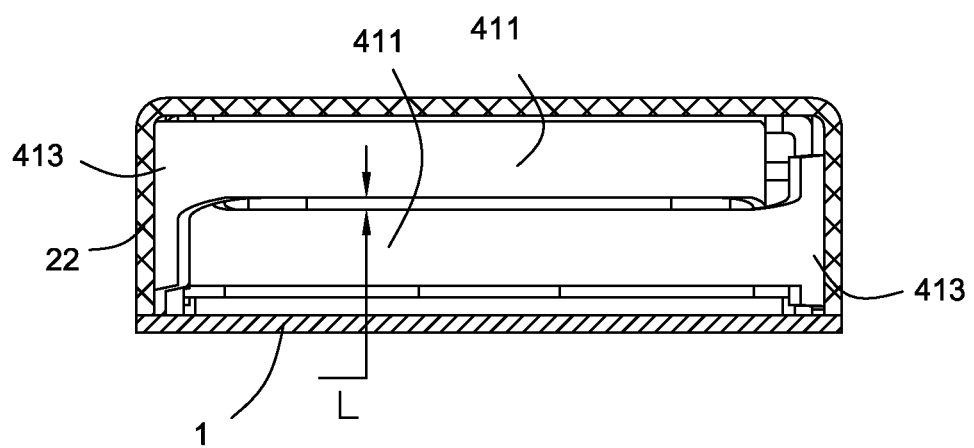
FIG. 6 is an enlarged cross-sectional view of the linear vibrator along line B-B in FIG. 1.

Referring to FIG. 2 and FIG. 5, the magnet assembly 6 is accommodated in the through holes 54 of the weight 5. Thus, the magnet assembly 6, together with the weight 5, is suspended in the hollow space 3 by the elastic members 4. The magnet assembly 6 provides a pair of magnets 61 parallel and face to the bottom wall 21 and also parallel to the coil 7. The magnetic poles of the magnets 61 near the coil 7 are opposite to each other.

The coil 7 is positioned on the bottom wall 22 and located below the pair of magnets 61.

The linear vibrator 100 further defines a pole plate 62 covering on the magnet assembly 6.

Referring to FIGS. 2 to 4, the pair of fastening arm 41 defines one fastening arm 41a and another fastening arm 41b. While assembled, when the outer arm 413 of one fastening arm 41a engages with the front sidewall 221 of the base 2, the outer arm 413 of another fastening arm 41b adjacent to the one fastening arm 41a engages with the back sidewall 222 of the base 2. Correspondingly, when the inner arm 412 of one fastening arm 41a engages with the front lateral 521 of the weight 5, the inner arm 412 of another fastening arm 41b adjacent to the one fastening arm 41a engages with the back lateral of 522 of the weight 5.

Figure 7:
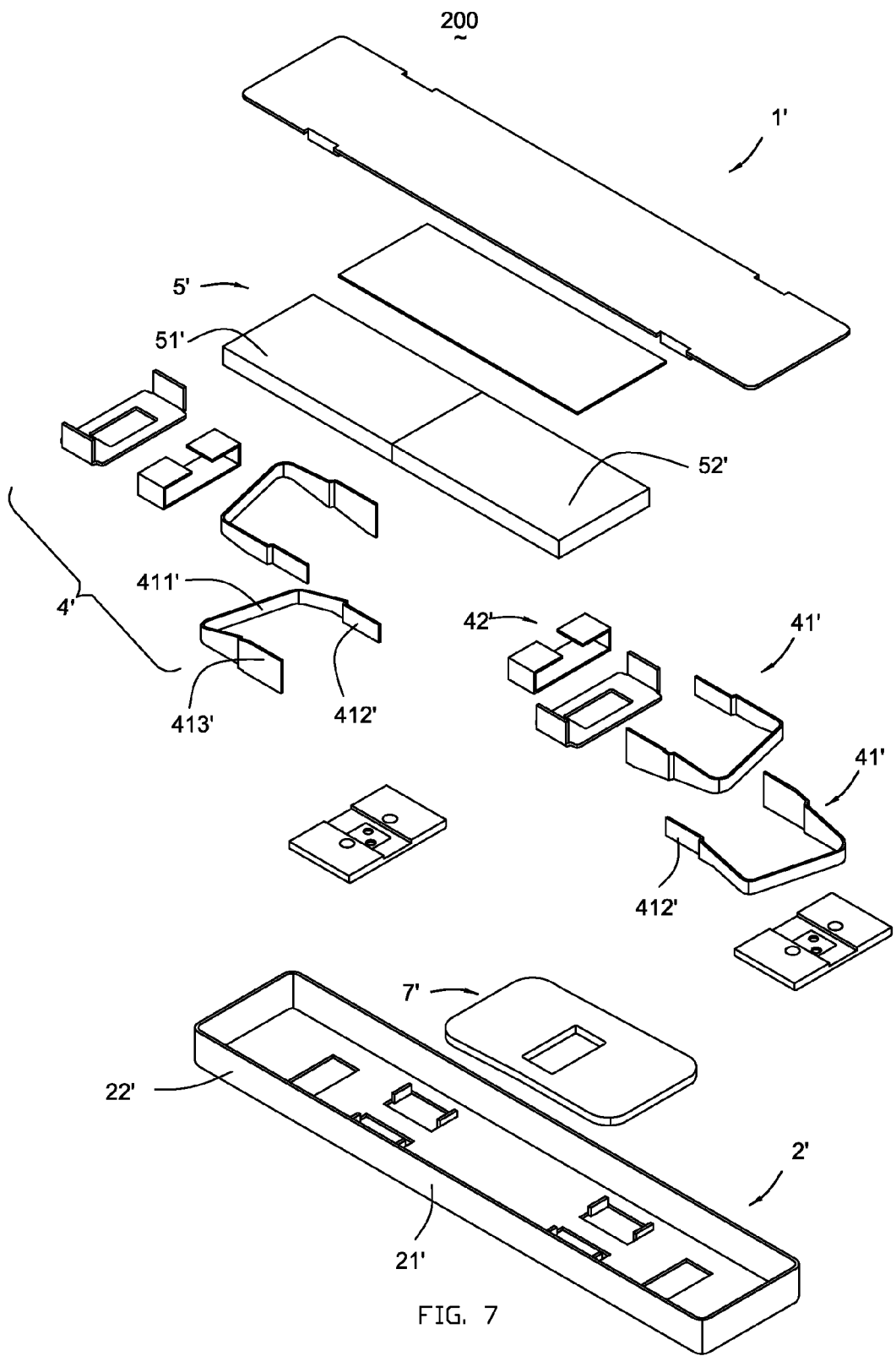
FIG. 7 is an exploded view of a linear vibrator according to a second exemplary embodiment of the present invention.

Referring to FIG. 7, a linear vibrator 200, in accordance with a second exemplary embodiment of the present invention, comprises a housing (no labeled) including a cover 1' and a base 2', a pair of elastic members 4' connected to the housing, a magnet 5' suspended in the housing by the elastic members 4', and a coil 7' positioned on the base 2' and located below the magnet 5'.

The base 2' defines a bottom wall 21' and a plurality of sidewalls 22' extending vertically from the bottom wall 21'.

The magnet 5' as a vibrating unit defines the South Pole 51' and the North Pole 52'. The South Pole 51 and North Pole 52 are all adjacent to the coil 7'.

Each elastic member 4' defines a pair of fastening arms 41'. Each fastening arm 41' comprises a connecting portion 411', an inner arm 412' extending from one end of the connecting portion 411' for abutting against the magnet 5', and an outer arm 413' extending from another end of the connecting portion 411' for abutting against the sidewall 22' of the base 2'.

Each elastic member 4' further defines a locking portion 42' attached on the magnet 5' for fixing the inner arm of 412' each elastic member 4' firmly.

Although the pair of magnet or coils is provided in the first embodiment and one magnet or coil is provided in the second embodiment, the number of magnet or coil is not limited either one or two.

The present linear vibrator defines the pair of elastic members thereby reducing the total height of the linear vibrator.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. A linear vibrator, comprising:
   a cover;
   a base forming a hollow space together with the cover and defining a bottom wall and a plurality of sidewalls extending from the bottom wall;
   a pair of elastic members received in the hollow space, each elastic member including at least a fastening arm comprising a connecting portion, an inner arm extending from one end of the connecting portion for abutting against the lateral of the weight, and an outer arm extending from another end of the connecting portion for abutting against the sidewall of the base;
   a weight suspended in the hollow space by the elastic members and defining a upper surface, a bottom surface opposite to the upper surface, a plurality of laterals connecting the upper surface and the bottom surface and a plurality of through holes drilled completely through the upper surface and the bottom surface;
   a magnet assembly provided with a plurality of magnetic poles and accommodated in the through holes of the weight;
   a coil positioned on the bottom wall and located below the magnet assembly;
   wherein, the inner arm extends along a direction same to a direction along which the outer arm extends; the vibrating direction of the linear vibrator is parallel to the bottom wall; and the magnetic poles of magnet assembly near the coil are opposite to each other; and each elastic member further defines a locking portion attached to the weight for cooperating with the laterals of the weight for fixing the inner arm of each fastening arm firmly.

2. The linear vibrator as described in claim 1, wherein each elastic member defines a pair of fastening arms, and the laterals of the weight defines a front lateral and a back lateral opposite to the front lateral, and the sidewalls of the base defines a front sidewall and a back sidewall opposite to the front sidewall; when the inner arm of one fastening arm engages with the front lateral of the weight, the inner arm of another fastening arm engages with the back lateral of the weight.

3. The linear vibrator as described in claim 2, wherein each elastic member defines a fixing portion sandwiched the base and the locking portion for cooperating with the sidewalls of the base for fixing the outer arm of each fastening arm firmly.

4. The linear vibrator as described in claim 3, wherein the base defines a pair of openings and each fixing portion defines a projecting portion engaging with the opening of the base, respectively.

5. The linear vibrator as described in claim 4, wherein the laterals of the weight are perpendicular to the bottom wall of the base.

6. The linear vibrator as described in claim 5, wherein the connecting portions of the fastening arms which are positioned on the same side of the weight are separated from each other in space, thereby defining an interval in a direction perpendicular to the bottom wall of the base.

7. The linear vibrator as described in claim 6, wherein a width of each outer arm is greater than that of each inner arm.

8. The linear vibrator as described in claim 7, wherein the weight defines a pair of flanges for positioning each locking portion thereon.

9. The linear vibrator as described in claim 8, wherein the linear vibrator further defines a pole plate covered on the magnet assembly.

10. A linear vibrator, comprising:
    a housing including a cover and a base, the base defining a bottom wall and a plurality of sidewalls vertically extending from the bottom wall;
    a plurality of elastic members connected to the housing, each elastic member defining a pair of fastening arms, each fastening arm comprising a connecting portion, an inner arm extending from one end of the connecting portion for abutting against the magnet, and an outer arm extending from another end of the connecting portion for abutting against the sidewall of the base;

a magnet suspended in the housing by the elastic members and defining the South Pole and the North Pole;

a coil positioned below the magnet;

wherein, the inner arm extends along a direction same to a direction along which the outer arm extends for sandwiching at least a part of the magnet between the inner and outer arms of each elastic member; the vibrating direction of the linear vibrator is parallel to the bottom wall; and the South Pole and North Pole are both adjacent to the coil; and each elastic member further defines a locking portion attached on the magnet for cooperating with the magnet for fixing the inner arm of each fastening arm firmly.

11. The linear vibrator as described in claim 10, wherein when the outer arm of one fastening arm is fixed on the sidewall of the base, and the inner arm of another fastening arm adjacent to the one fastening arm is fixed on the magnet.

12. The linear vibrator as described in claim 11, wherein each elastic member defines a fixing portion sandwiched the base and the locking portion to cooperate with the sidewalls of the base for fixing the outer arm of each fastening arm firmly.

13. The linear vibrator as described in claim 12, wherein the base provides with a pair of openings and each fixing portion defines a projecting portion engaging with the opening of the base, respectively.

14. The linear vibrator as described in claim 13, wherein the connecting portions of the pair of fastening arms which are positioned on the same side of the magnet is separated from each other in space, thereby defining an interval in a direction perpendicular to the bottom wall of the base.

15. The linear vibrator as described in claim 14, wherein a width of each outer arm is greater than a width of each inner arm.

16. The linear vibrator as described in claim 15, wherein the linear vibrator further defines a pole plate covered on the magnet assembly.

* * * * *